United States Patent Office 2,720,501
Patented Oct. 11, 1955

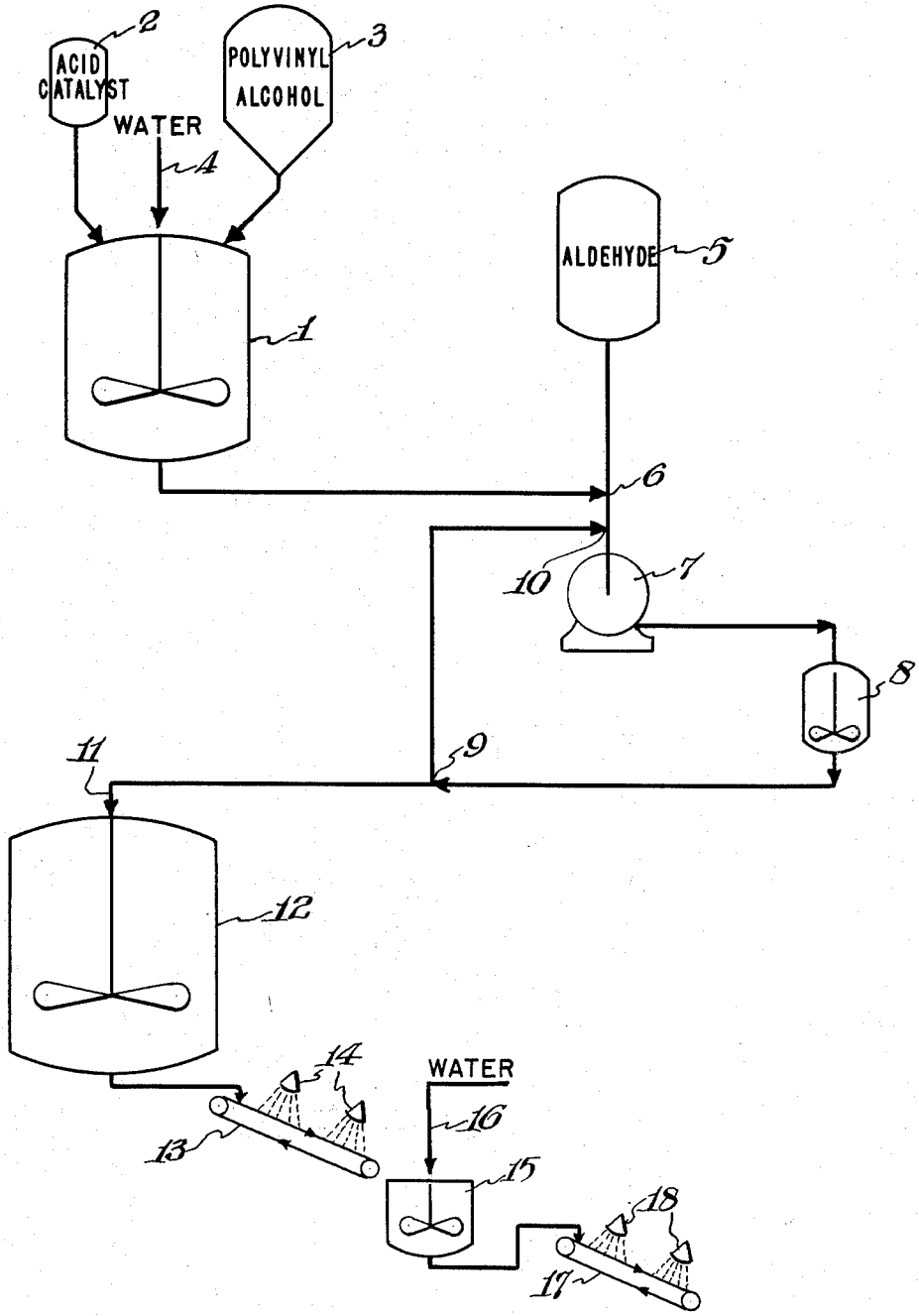

2,720,501

AQUEOUS CONDENSATION PROCESS FOR THE PREPARATION OF POLYVINYL ACETAL RESINS

Robert Terry Van Ness, Wilmington, Del., assignor to E. I. du Pont de Nemours and Company, Wilmington, Del., a corporation of Delaware Application August 10, 1954, Serial No. 448,876

4 Claims. (Cl. 260—73)

This invention relates to the preparation of polyvinyl acetal resins and, more particularly, it relates to a process for the preparation of such a resin in an aqueous medium and in the absence of a solvent for the resin.

It is well known that polyvinyl acetal resins may be prepared by condensation of polyvinyl alcohol with any of a group of aldehydes. It has been the general practice in the past to carry out this reaction in the presence of a large amount of a solvent such as alcohol and thereby to recover the polyvinyl acetal resin in the form of a thick viscous solution. In order to transform the viscous solution of polyvinyl acetal into a flake material the solution was subjected to a series of water treatments by means of which the alcohol solvent was removed and the resin precipitated in the form of a flake material. The alcohol solvent was then purified by means of extensive distillation steps and recirculated to the beginning of the process.

It has now been found that polyvinyl alcohol may be condensed with an aldehyde in the absence of a solvent for the condensed resin thereby eliminating the costly process of recovering an alcohol solvent.

It is an object of the present invention to provide a process for the condensing of polyvinyl alcohol with an aldehyde in the presence of a reaction medium which is not a solvent for the condensed resin. It is a specific object of this invention to provide a process for the preparation of polyvinyl butyral resin which does not include the necessity of recovering large amounts of an expensive organic solvent. Other objects will be apparent from the more detailed description of the invention which follows.

The above objects are accomplished in the process of this invention by the steps of (1) preparing a mixture of an aqueous polyvinyl alcohol solution, a strong acid catalyst, and an aliphatic aldehyde having 2–6 carbon atoms, said aldehyde being present in an amount which is 5% to 40% in excess over the theoretical amount which will condense with the desired number of hydroxyl groups in the polyvinyl alcohols, (2) pumping the resultant mixture at 50° C. to 95° C. in a recirculating loop from which a continuous side stream is drawn off, the flow rate of the side stream being not more than about 1/10 of the flow rate in the recirculating loop and the linear velocity of the fluid in the recirculating loop being not less than about 5 feet per second, (3) collecting the material flowing from the side stream and maintaining it at a temperature of about 60° C. to 100° C. until the desired degree of acetalization is essentially completed, (4) raising the pH of the resulting polyvinyl acetal slurry to some value from about 5 to about 7, (5) removing excess aldehyde, (6) stabilizing the resulting polyvinyl acetal resin slurry by raising the pH to about 8 or more and (7) recovering a polyvinyl acetal resin flake. In the preferred embodiment of this invention the aldehyde is butyraldehyde and the polyvinyl butyral resin product contains not more than about 2% by weight of vinyl acetate groups, 18% to 21% by weight of vinyl alcohol groups, and the remainder is polyvinyl butyral.

In the attached drawing there is illustrated in a schematic fashion a flow sheet representing the process of this invention. A solution of polyvinyl alcohol in water is prepared in vessel 1 which is fitted with a means for agitating and a means for heating the contents of the vessel. Polyvinyl alcohol from a storage vessel 3 is added to vessel 1 along with sufficient cold water at a temperature from about 20° C. to 30° C. to form a suspension containing about 7 to about 15% solid polyvinyl alcohol. Polyvinyl alcohol is prepared by hydrolyzing polyvinyl acetate in the presence of an alkaline catalyst or an acid catalyst. Depending upon the polyvinyl acetate used, the type of hydrolysis catalyst, and the degree to which the hydrolysis is completed, many varieties of polyvinyl alcohol may be prepared. These polyvinyl alcohols may vary in viscosity, in purity, in the amount of residual unhydrolyzed acetate groups on the polymer chain, and other features. Any of these varieties of polyvinyl alcohol may be employed in the process of this invention to prepare a polyvinyl acetal resin, although selected varieties are preferred when it is desired to prepare a resin having good enough optical quality to be used in the manufacture of safety-glass interlayer. For the latter purpose it is preferred to employ pure polyvinyl alcohol containing not more than about 3% by weight of vinyl acetate units and having a viscosity from about 20 to about 60 or more centipoises when measured as a 4% aqueous solution.

The mixture of polyvinyl alcohol and cold water is agitated in vessel 1 for about 30 minutes in order to break up any large lumps of the polyvinyl alcohol. This aqueous suspension is then heated to a temperature of about 95° C. and agitated until a clear solution is obtained. The solution is then cooled to a temperature of about 75° C.

An acid catalyst is added from storage vessel 2 to the polyvinyl alcohol solution in an amount sufficient to lower its pH to about 2. The catalyst may be added to the polyvinyl alcohol at any step in the above-described preparation of the polyvinyl alcohol solution. Almost any strong acid may be used as a catalyst such as hydrochloric, formic, phosphoric, sulfuric, methylolsulfonic or toluenesulfonic, the last of these, particularly the para-isomer, being preferred primarily because it produces more uniform resin particles at a higher rate of reaction and with fewer adhesions to the reactor walls. Because of the high rate of reaction associated with the use of p-toluenesulfonic acid in this process, it may be desirable in some instances to employ a mixture of sulfuric acid and p-toluenesulfonic acid as the catalyst of this process. It appears that there is an optimum pH of the solution at this point since pH values of about 2.5 or higher cause the condensation reaction, which will be described later, to be too slow for commercial attractiveness. On the other hand, pH values below about 1.5 tend to cause excessive corrosion of the reaction vessel.

Polyvinyl alcohol, aldehyde and acid catalyst may be combined in any order of addition, for example, the polyvinyl alcohol and the acid catalyst may be combined prior to the addition of aldehyde, the polyvinyl alcohol and the aldehyde may be combined prior to addition of the acid catalyst, or all three constituents may be added simultaneously. The preferred order of combination is that shown in the drawing.

The solution of polyvinyl alcohol, water, and acid catalyst is discharged from vessel 1 through junction 6 to the inlet of pump 7. At the same time, aldehyde from storage vessel 5 is added through junction 6 to the inlet of pump 7. The rate of aldehyde addition is carefully controlled with relation to the amount of solution being added from vessel 1. The amount of aldehyde which is added should be in excess of the theoretical amount required to produce the desired final acetal product and it is preferred that from about 10% to about 40% excess aldehyde be employed. High quality polyvinyl butyral resin, which is used for an interlayer in safety glass production, is preferably acetalized to the extent that approximately 18% to 21% by weight of the product resin is vinyl alcohol which means that the acetalization reaction is from about 69% to about 75% complete. The theoretical amount of butyraldehyde required to produce such partially acetalized products may be expressed as a weight ratio of butyraldehyde to polyvinyl alcohol, a ratio of 0.60 producing a 18% vinyl alcohol resin and a ratio of 0.57 producing a 21% vinyl alcohol resin. Since these ratios are for the theoretical butyraldehyde requirements, it is pointed out that the preferred embodiment of this invention utilizes about 10% to about 40% excess over the theoretical requirements of butyraldehyde. The exact amount of excess butyraldehyde depends upon many variables of the reaction, such, for example, as the catalyst employed, the reaction temperature, the concentration of the polyvinyl alcohol, and other factors known to those skilled in the art. When employing p-toluenesulfonic acid as a catalyst and the general conditions of Example 1 which follows, the amount of butyraldehyde employed is about 15% in excess over the theoretical amount required to acetalize from about 69% to about 75% of the available hydroxyl groups. Based on 15% excess, the amount of butyraldehyde in the preferred embodiment of this invention then becomes from 0.65 to 0.69 pound per pound of polyvinyl alcohol. On the other hand, when employing sulfuric acid as the catalyst in the general reaction described in Example 3 which follows, the amount of butyraldehyde used is about 40% in excess of the theoretical amount required to acetalize from about 69% to about 75% of the available hydroxyl groups. Furthermore, lower reaction temperatures or lower concentrations of polyvinyl alcohol require slightly higher excess of aldehyde.

The mixture at junction 6 is thoroughly agitated as it is pumped in a recirculation loop through hold-up vessel 8 to junction 9 to junction 10 and finally returned to the inlet of pump 7. A small sidestream 11 is continuously drawn off from junction 9 and added to condensation reactor 12. The condensation product of aldehyde and polyvinyl alcohol, when it first forms, is extremely sticky and tends to agglomerate quite readily into large masses and into adhesions on the wall of the vessel. The prereactor loop from the outlet of pump 7 through hold-up vessel 8 and back to the inlet of pump 7 has been found to provide a combination of sufficient agitation and time to allow the initial condensation product to form into discrete particles without the formation of any extensive amount of agglomerates. Preferably the flow rate through the prereactor loop is 20 to 60 times or more the flow rate of the sidestream 11, flow rates of 50 to 60 times the flow rate of sidestream 11 being the most desirable. Higher rates are of course, operable although the time of reaction is considerably lengthened, and rates as low as 10 times the flow rate of sidestream 11 may be employed in certain embodiments of this invention. Sufficient agitation to prevent the formation of agglomerates is obtained by having high linear velocities in the piping which makes up the prereactor loop. It has been found that if the linear velocities are greater than 5 feet per second, no agglomeration takes place, although it is preferable if the velocity is at least 10 to 12 feet per second. The prereactor loop is provided with a hold-up vessel 8 which serves to expand the volume of the prereactor loop without employing a large amount of piping. The hold-up vessel is preferably fitted with a means for agitation, which may be a mechanical stirring device, a tangential nozzle, or other means known to those skilled in the art. The size of the prereactor loop should be sufficient to provide an average hold-up time for about 10 minutes for the material flowing in the prereactor loop. This hold-up time is sufficient to allow the resin which is forming to pass the initial sticky stage and to be introduced into the condensation reaction 12 without fear of forming agglomerates. The temperature employed in the prereactor loop is from about 50° C. to about 95° C. and the pressure employed in the loop should be high enough to prevent vaporization of the materials flowing in the loop thus preventing pump cavitation, loss of circulation, flow and so forth.

The partially condensed substance flowing through sidestream 11 is collected in reactor 12 and maintained for about two hours at a temperature of about 60° C. to 100° C. in order to complete the condensation reaction. Reactor 12 is fitted with a means for agitating its contents so as to prevent agglomeration of the resinous particles in the slurry. When condensation reactor 12 is initially put into operation, sufficient water and catalyst acid is placed in reactor 12 to fill any space between the bottom of the moving agitator and the bottom of reactor 12. In this manner the first portion of partially condensed substance flowing from sidestream 11 to reactor 12 is immediately agitated, and there is no possibility that agglomeration of the partially condensed substance will take place. The attached drawing shows a batch operation in that a single condensation reactor 12 is employed. However, it is not meant to infer that this reaction is not suitable for a continuous reaction wherein multiple condensation reactors could be used, stream 11 being capable of feeding the several condensation reactors in parallel or being diverted from one reactor to another.

After the condensation reaction has been completed, the reaction pressure is released and an alkaline substance such as sodium hydroxide is added to raise the pH to about 5–7 so as to neutralize the excess acid. Since aldol condensation is favored by basic conditions, it is not desirable to raise the pH above 7 until after the removal of the excess aldehyde present. The excess aldehyde is then boiled off preferably by applying a vacuum to reactor 12. If other methods for removing the excess aldehyde are employed, such as a rapid flash evaporation, it may not be necessary to add the alkaline substance at this point. Stabilization of the resin is then accomplished by adding sufficient alkali to raise the pH to at least 8, and preferably about 10, and maintaining the reaction medium at that point for about 1 hour at 85° C.

The stabilized slurry in reactor 12 may then be cooled and thoroughly washed, filtered, reslurried, and washed and filtered again in order to produce a granular or flake resin. This washing and filtering may be accomplished by any known means, one of which is shown in the attached drawings, illustrating the discharge of slurry from reactor 12 onto a moving or travelling screen 13 which is of small enough mesh size to retain the resin particles on the screen and to allow the aqueous medium to drain through the screen. The wet cake which is formed on screen 13 is washed by means of water sprayers 14. The wet cake leaving screen 13 is discharged into a reslurrying vessel 15 into which water is added at 16 and the new slurry is thoroughly agitated in order to contact all resin particles with fresh water. The slurry which leaves vessel 15 is discharged on a second moving screen 17 which is similar to screen 13. Water sprayers 18 are provided for washing the resin particles as they travel forward on screen 17. The material discharged from screen 17 is a wet cake of polyvinyl acetal resin which may be dried and packaged for sale as a final product or, in the case of polyvinyl butyral resin, may be further processed to produce a plasticized resin sheeting for use as a safety glass interlayer or for other known purposes.

The examples which follow are given to illustrate the preferred embodiments of this invention:

*Example 1.*—A 10% solution of polyvinyl alcohol is prepared by adding a sufficient amount of dry polyvinyl alcohol solids to cold water (20–40° C.), and agitating the mixture until all lumps have been dispersed. The polyvinyl alcohol used contains about 2% by weight of unhydrolyzed vinyl acetate groups and has a viscosity of 30 centipoises when measured as a 4% aqueous solution at 20° C. The slurry is then heated to 95° C. and held at that temperature until a clear solution is obtained. Sufficient p-toluenesulfonic acid is added to the solution to lower its pH to about 2.0 and the solution is cooled to 75° C. There is added to the condensation reactor kettle 50 pounds of water acidified to a pH of 2.0 with p-toluenesulfonic acid, agitation is begun, and the kettle is heated to 85° C. by hot water in the jacket. The prereactor loop (as indicated by 7, 8, 9, and 10 in the attached drawing) is filled with water, circulation is started, and the system is heated to 75° C. with hot water in the jacket around hold-up vessel 8. Butyraldehyde, in the amount of 22 pounds is added through one line, and polyvinyl alcohol solution is added through another line, to the prereactor loop; each of the lines being connected to the prereactor loop at the pump inlet through separate equipment capable of indicating and controlling the flow rates of each stream, such as a variable speed pump and a rotameter. The addition of butyraldehyde is begun 3 to 5 minutes prior to the addition of polyvinyl alcohol. The rates of addition of the two streams are such that both will be completed simultaneously in about 70 minutes. The prereactor loop has a total volume which will provide 10 minutes average contact time for the feed streams, and the circulation rate is such that the linear velocity in the loop is at least 12 ft./sec. Material is drawn off from the prereactor loop into the condensation reactor at a rate which maintains 20–25 p. s. i. gauge pressure in the prereactor. The contents of the condensation reactor are maintained at 85° C. and are vigorously agitated. As the reactor is filled, inert gases such as air are vented through a condenser to prevent loss of butyraldehyde vapors and to maintain 3–6 p. s. i. gauge pressure in the reactor. When the addition of material is complete, the condensation reactor is held at 85° C. for 2 hours to complete the reaction. The condensation reaction product is a slurry of polyvinyl butyral resin particles in water. The particles are about 0.01 inch in diameter on the average and are somewhat hard and horny. Sufficient sodium hydroxide in the form of a 4% aqueous solution is then added slowly to raise the pH to about 5.8, the temperature is increased to 100° C., the pressure vented to atmospheric, and the mixture boiled for 45 minutes to distill out the excess butyraldehyde as a dilute aqueous solution. Residual butyraldehyde, after this treatment, amounts to about 0.02–0.05% by weight of the aqueous liquor. The resin slurry is then cooled to 90° C., more sodium hydroxide is added in the form of a 4% aqueous solution to raise the pH to 10; and the stabilization of the resin is completed by holding the agitated slurry at 90° C. for one hour. The slurry is then cooled to 50° C. and filtered. The resin is washed free of excess alkali by reslurrying five times, each in 150 pounds of water. This resin contains the equivalent of 18–19% by weight polyvinyl alcohol, less than 2% by weight of polyvinyl acetate, while the remainder is polyvinyl butyral.

*Example 2.*—A 10% polyvinyl alcohol solution in the amount of 291 pounds is made up in the manner described in Example 1, except that the acid is not added at this point. After cooling the polyvinyl alcohol solution to 50° C., 20 pounds of butyraldehyde is added to the solution. Acid catalyst solution composed of 1.60 pounds of p-toluenesulfonic acid and 21.4 pounds of water is added through a separate feed system to the solution of polyvinyl alcohol and butyraldehyde. The condensation reactor and the prereactor loop are prepared as in Example 1. The addition of acid catalyst solution is begun about 10 minutes prior to the addition of polyvinyl alcohol-butyraldehyde solution at rates such that both additions will be completed simultaneously about 70 minutes after the start of the alcohol addition. The prereactor loop and condensation reactor are operated as described in Example 1. Butyraldehyde removal, stabilization, and washing are accomplished in the manner described in Example 1. The product obtained is essentially the same as that of Example 1 as far as the proportion of polyvinyl alcohol, polyvinyl acetate, and polyvinyl butyral is concerned.

*Example 3.*—In the same manner as that described in Example 2, 291 pounds of a 10% aqueous solution of polyvinyl alcohol is reacted with 24 pounds of butylraldehyde in the presence of 0.5 pound of sulfuric acid as a catalyst. The resin product contains about 21% by weight of polyvinyl alcohol, less than 2% by weight of polyvinyl acetate, and the remainder is polyvinyl butyral.

I claim:

1. The process comprising (1) preparing a mixture of an aqueous polyvinyl alcohol solution, a strong acid catalyst, and an aliphatic aldehyde having 2 to 6 carbon atoms, said aldehyde being present in an amount which is 5% to 40% in excess over the theoretical amount which will condense with the desired number of hydroxyl groups in said polyvinyl alcohol, (2) pumping the resultant mixture at 50° C. to 95° C. in a recirculating loop from which a continuous sidestream is drawn off, the flow rate of the sidestream being not more than about one-tenth of the flow rate in the recirculating loop and the linear velocity of the fluid in the recirculating loop being not less than about 5 feet per second, (3) collecting the material flowing from the sidestream and maintaining it at a temperature of about 60° C. to 100° C. until the desired degree of acetalization is essentially completed, (4) raising the pH of the resulting polyvinyl acetal resin slurry to some value from about 5 to about 7, (5) removing excess aldehyde, (6) stabilizing the resulting polyvinyl acetal resin by raising the pH to about 8 or more, and (7) recovering a polyvinyl acetal resin.

2. The process of claim 1 in which said aldehyde is butyraldehyde and said polyvinyl acetal is polyvinyl butyral.

3. The process comprising (1) preparing a solution of polyvinyl alcohol and a strong acid catalyst in water, the solution having a pH of from 1.5 to 2.5, (2) adding to said solution about 15% excess butyraldehyde over the theoretical amount required to form a polyvinyl butyral resin containing 19%–21% by weight of residual hydroxyl measured as vinyl alcohol, (3) pumping the resultant mixture at 50° C. to 95° C. in a recirculating prereactor loop from which a continuous sidestream is drawn off, the flow rate of the sidestream being from about one-twentieth to about one-sixtieth of the flow rate of fluid in the recirculating loop and the linear velocity of the fluid in the recirculating loop being more than 10 feet per second, (4) collecting the material flowing from the sidestream and maintaining it at a temperature of 60° C. to 100° C. until from about 69% to about 75% of the hydroxyl groups of said polyvinyl alcohol are acetalized, (5) adding alkali to the resulting polyvinyl butyral resin slurry to change the pH to about 5–7, (6) removing excess butyraldehyde, (7) stabilizing the slurry by adding more alkali until the pH is at least 8, and (8) recovering a polyvinyl butyral resin containing 18% to 21% by weight of hydroxyl, measured as vinyl alcohol.

4. The process comprising (1) preparing a solution of 7% to 15% by weight of polyvinyl alcohol in water and adding sufficient p-toluenesulfonic acid to bring the pH of the solution to about 2, (2) adding to said solution from 0.65 to 0.69 pound of butyraldehyde per pound of polyvinyl alcohol, (3) pumping the resultant mixture, at 50° C. to 95° C. and under a pressure which prevents vaporization, in a recirculating loop from which a sidestream is continuously drawn off, the flow rate of the sidestream being from about one-fiftieth to one-sixtieth of the flow rate in the recirculating loop and the linear velocity of the fluid flowing in the recirculating loop being at least 12 feet per second, (4) collecting the fluid leaving the sidestream and maintaining it under agitation for at least one hour at 60° C. to 100° C., (5) adding sufficient alkali to the resulting polyvinyl butyral resin slurry to change the pH to about 6–7, (6) removing excess butyraldehyde by vaporization, (7) stabilizing the slurry by adding more alkali until the pH is about 10, and (8) recovering a polyvinyl butyral resin containing 18% to 21% by weight of hydroxyl, measured as vinyl alcohol.

References Cited in the file of this patent

UNITED STATES PATENTS

| | | |
|---|---|---|
| 2,283,872 | Pratt | May 19, 1942 |
| 2,422,754 | Stamatoff | June 24, 1947 |
| 2,445,970 | Reinhardt | July 27, 1948 |